United States Patent [19]

Petersen

[11] 4,105,596

[45] Aug. 8, 1978

[54] PRODUCTION OF EXPANDABLE BEADS FROM THE THERMOPLASTIC MATERIALS

[75] Inventor: Jørgen Petersen, Sundsvall, Sweden

[73] Assignee: KemaNobel AB, Stockholm, Sweden

[21] Appl. No.: 858,122

[22] Filed: Dec. 6, 1977

[30] Foreign Application Priority Data

Dec. 10, 1976 [SE] Sweden ................................ 7613937

[51] Int. Cl.$^2$ ............................................... E08J 9/20
[52] U.S. Cl. .......................................... 521/56; 526/80
[58] Field of Search ........................ 260/2.5 B; 526/80

[56] References Cited

U.S. PATENT DOCUMENTS

| | | | |
|---|---|---|---|
| 3,951,883 | 4/1976 | Ruchlak | 260/2.5 B |
| 3,994,840 | 11/1976 | Kajimura et al. | 260/2.5 B |
| 4,067,827 | 1/1978 | Takauo et al. | 260/2.5 B |

Primary Examiner—Morton Foelak
Attorney, Agent, or Firm—Fred Philpitt

[57] ABSTRACT

This invention relates to a process for production of expandable thermoplastic beads with improved yield and with improved expandability. The process involves maintaining the polymerization vessel full of liquid at a certain pressure or with a gradually increased outside pressure on the reaction media.

4 Claims, No Drawings

PRODUCTION OF EXPANDABLE BEADS FROM THE THERMOPLASTIC MATERIALS

BACKGROUND

Expandable thermoplastic beads, e.g. polystyrene beads, are commercially produced by a suspension polymerization where liquid styrene monomer is dispersed in an aqueous medium containing one or more suspension agents, a hydrocarbon blowing agent and a polymerization catalyst. The polymerization is often performed at temperatures above 70° C and sometimes above 100° C in order to reduce the amount of residual monomers in the beads.

The obtained beads comprise polymer shells containing the liquid, volatile blowing agent. The beads expand by being heated to a temperature above the boiling point of the blowing agent and above the softening point of the polymer. The beads can be used for the production of cellular material, which finds many uses in the insulation industry or packaging industry. As examples of other special uses there can be mentioned the production of paper or paperboard having a low density as described in the U.S. Pat. No. 3,941,634.

In the initial stage of the polymerization, e.g. in the case of expandable polystyrene beads, the styrene and the blowing agent, pentane or another hydrocarbon, form a droplet with only one phase. In a later stage of the polymerization the blowing agent is not soluble in the polymer phase and builds a separate phase in the form of small inclusions in the polymer droplets. In the initial stage the pressure may be 100 – 200 kPa. The pressure increases during the polymerization to 300 – 500 kPa depending on the blowing agent and the temperature. The high concentration of blowing agent inside the beads and the high temperature produce a considerable pressure inside the beads, and they expand in the unfilled or gas-filled part of the reactor. The unfilled or gas-filled part of the reactor is referred to as the "free volume" in the following description. The "free volume" is further increased during polymerization because of an increase in density of about 20% in the conversion from monomer to polymer.

The pre-expanded beads are a problem and increase the cost of production. The pre-expanded beads have to be separated by filtration or by other means from unexpanded beads, and the pre-expanded beads increase the amount of waste.

Attempts have been made to avoid the pre-expansion of the beads by applying a high pressure e.g. 500 – 1500 kPa of an inert gas (e.g. nitrogen) during the polymerization. However, this does not eliminate the pre-expanded beads. The gas does not actually apply a higher pressure on the outside of the beads. An equilibrium between the gas inside the beads and the gas in the "free volume" in the reactor is established. The beads continue to expand because of the "free volume". and the high pressure of hydrocarbon inside the beads.

THE PRESENT INVENTION

This invention solves the problem of pre-expanded beads by using a reactor completely filled up with the reaction media and the beads during the polymerization. This is achieved by connecting the reactor to an external aqueous pressure source, such as a water pipe or an expansion tank which is partly filled with water, and which has suitable means for applying pressure to the water surface. The pipe connection from the expansion tank to the reactor is suitably made through the bottom of the expansion tank and preferably to the lower part of the reactor when the monomer or monomer mixture has a density lower than water. During the polymerization the volume of the beads is reduced by about 20% by the change in the density from the monomer to the polymer. Water is moved from the expansion tank to the reactor. The amount of water moved from the expansion tank indicates the degree of conversion, an easy way to control this important variable, which is another advantage of the system. The water actually applies a pressure on the surface of the beads determined by the pressure in the tank. It is within the scope of the invention also to add pollymerizing aids to the water in the tank, e.g. suspending agents.

By using the present process the beads do not to any substantial degree expand during the polymerization if a suitable pressure is applied to the liquid in the tank or in a water pipe to the reactor.

Another advantage of the present invention is that the obtained beads expand by heating to products with a very low density i.e. they have a higher degree of expandability in comparison with beads obtained by known methods using a polymerization vessel only partly filled with liquid.

The necessary pressure is a function of both temperature and type of blowing agent and can easily be determined by simple tests. High polymerization temperature and a blowing agent with a low boiling point demand high pressure, otherwise the beads expand and the pressure moves some of the water back into the expansion tank.

The necessary pressure or maximum pressure can be applied to the system from the beginning of the polymerization, and is in the range of 500 – 2000 kPa e.g. for styrene beads with pentane as blowing agent, boiling point 36.1° C. The pressure can also be increased gradually from 100 – 500 kPa at the beginning of the polymerization to 500 – 2000 kPa at the end in the pentane system. A blowing agent such as isobutane with a boiling point of $-11.7°$ C requires a pressure within the range of 1000 – 2500 kPa.

The process of the present invention is applicable to polymerization of all ethylenically unsaturated monomers or mixtures of such monomers capable of forming polymer beads containing blowing agents. As examples of such monomers there can be mentioned styrene, vinylidene chloride, acrylic esters, methacrylic esters, acrylonitrile, copolymers of butadiene or other dienes and styrene and acrylonitrile.

The process is preferably used for polymerization of styrene or styrene and up to 40% of its weight of a copolymerisable ethylenically unsaturated monomer, especially the copolymerization of styrene with up to 40% by weight of acrylonitrile, based on the styrene, or the copolymerization of vinylidene chloride and up to 40% by weight of acrylonitrile or vinyl chloride, based on the vinylidene chloride, especially the copolymerization of 65 – 90% by weight of vinylidene chloride and 35 – 10% by weight of acrylonitrile. The essential feature of the process is to have the reaction vessel or polymerization vessel filled with the reaction medium during the polymerization. It will be appreciated that all known polymerization recipes for the above monomers are suitable, including known monomer soluble free radial initiators.

Suitable liquid volatile blowing agents are: petroleum ether, pentane, isopentane, neo-pentane, hexane, heptane, cyclopentane, cyclohexane, iso-butylene, n-butane and iso-butane. The blowing agents are in a known manner used in amounts of 2 – 95, preferably 5 – 40% by weight based on the monomers.

The invention is described more in detail in the following examples which, however, are not intended to limit the same.

EXAMPLE 1

(Comparing test)

A polymerization experiment was performed in a 13 l reactor equipped with a stirrer and a mantel for heating and cooling of the reaction medium. The reactor was connected to an external tank which was used for charging the monomer mixture to the reactor.

The following recipe was used to evaluate the system:

| | |
|---|---|
| styrene/acrylonitrile, ratio 90:10 (by weight) | 100.0 parts by weight |
| blowing agent, pentane | 10.0 parts by weight |
| suspension agent, polyvinyl alcohol | 1.0 part by weight |
| suspension agent, colloid of silica type | 0.5 part by weight |
| initiator, benzoyl peroxide | 1.0 part by weight |
| water | 400.0 parts by weight |

8.0 liters of water and the suspension agents were charged to the reactor, and the reactor was evacuated for 900's. 3.2 liters of the monomer mixture comprised of styrene-acrylonitrile with pentane and the initiator were charged to the reactor. The temperature was raised to 75° C and kept there for 12 hours. The pressure in the reactor was raised to about 200 kPa (1 atom). with nitrogen gas at the initial stage of the polymerization. The reactor was not connected with the external tank during the polymerization and under these conditions the pressure in the reactor rose gradually during the polymerization to about 500 kPa and a gas space formed above the liquid in the reaction vessel.

The reactor was cooled from 75° C to about 25° C. The produced bead suspension contained a lot of pre-expanded beads having a particle size of 150 – 300 μm.

It was difficult to remove all the pre-expanded beads from the reactor by a simple tapping procedure. The amount of expanded beads and other types of waste were collected on a screen. The amount of waste was more than 150 g per kg of charged monomer. A method to determine the expandability of the beads is to expand 1 g of beads in boiling water for 60 s. and then measure the expanded volume in ml in a graduated cylinder. The unexpanded beads had a particle size of 30 to 95 μm and expanded in boiling water to 31 ml per 1 g beads.

EXAMPLE 2

(Comparing test)

A polymerization was performed with the same recipe and the same procedures as Example 1. However, the initial pressure in the reactor was kept at 850 kPa by introducing nitrogen (the pressure was only 200 kPa in Example 1). The reactor was not connected to the external tank during the polymerization and the pressure rose to 1300 kPa, thus leaving a gas space above the liquid in the reactor. The produced bead suspension contained a lot of pre-expanded particles, with a size of 140 – 300 μm. The amount of pre-expanded beads and waste was more than 150 g per kg charged monomer. The unexpanded beads had a particle size of 30 to 90 μm and expanded in boiling water to 27 ml per 1 g beads.

EXAMPLE 3

A polymerization was performed with the same recipe and the same procedure as Examples 1 and 2. However, the initial pressure in the expansion tank and in the reactor was 500 kPa, and the pressure was gradually increased to 850 kPa during polymerization. The reactor was connected to the external tank during the polymerization and about 500 ml of water were moved by pressure from the expansion tank to the reactor, so as to keep the reactor filled with liquid throughout the polymerization.

The produced bead suspension was completely free from preexpanded particles and the amount of waste less than 10 g per kg of charged monomer. The unexpanded beads had a particle size of 30 to 90 μm and expand in boiling water to 45 ml per 1 g beads.

EXAMPLE 4

A polymerization was performed with the same recipe and the same procedure as Example 3 with the exception that the pressure in the system was kept constant at 850 kPa during the polymerization. The reactor was filled with liquid throughout the polymerization. The produced bead suspension was completely free from pre-expanded particles and the amount of waste was less than 10 g per kg of charged monomer. The unexpanded beads had a particle size of 30 to 90 μm and expand in boiling water to 40 ml per 1 g beads.

EXAMPLE 5

A series of tests were carried out with different monomer systems. The polymerizations were performed in a 13 liter reactor equipped with a stirrer and a mantel for heating and cooling of the reaction medium. The reactor was connected to an external tank which also was used for charging the monomers to the reactor.

The following recipes were used (all amounts are given in parts by weight):

| | Test I | Test II | Test III |
|---|---|---|---|
| styrene | 100 | — | — |
| acrylonitrile | — | — | 25 |
| vinylidene chloride | — | — | 75 |
| methylmethacrylate | — | 100 | — |
| suspension agent, polyvinyl alcohol | 1.0 | 1.0 | 1.0 |
| suspension agent, colloid of silica type | 0.5 | 0.5 | 0.5 |
| blowing agent, pentane | 10 | 10 | 10 |
| initiator, benzoyl peroxide | 1.2 | 1.2 | 1.2 |
| water | 400 | 400 | 400 |

In all tests water with suspension agents were charged to the reactor, and the reactor was evacuated for 900 s. The monomer and monomer mixture respectively together with the blowing agent were charged to the reactor to a degree of filling of about 80% of the reactor volume. In a first series of runs the reactor was disconnected from the external tank. The temperature in the reactor was raised to 75° C and kept there for 12 hours. Thereafter the reactor was cooled to 25° C and opened. The produced bead suspension contained in all cases pre-expanded beads in amounts of 80 g (Test I), 160 g (Test II) and 70 g (Test III) per kilo charged monomer.

In a second series of runs the polymerization according to Test I, II and III were repeated with the same equipment and the same recipes as described in the beginning of this example but with the difference that the reactor was connected with the external tank. During the polymerization the pressure in the reactor and the external tank was kept at 850 kPa and the reactor was kept completely full during the polymerization cycle by water moved from the external tank to the reactor. The bead suspensions produced were almost completely free from pre-expanded beads and the amount of waste was less than 10 g per kg of charged monomer.

I claim:

1. In the known process for preparing expandable thermoplastic beads by introducing an aqueous suspension of at least one unsaturated monomer and a blowing agent into a polymerization vessel under polymerization conditions and carrying out polymerization, the improvement which comprises keeping the entire volume of the polymerization vessel filled with liquid throughout the polymerization so as to leave no space for the accumulation of gas in the polymerization vessel.

2. The process according to claim 1 characterized in that the polymerization vessel is kept filled by the addition of water.

3. The process according to claim 1 characterized in that the polymerization vessel is kept filled by the addition of water at a constant pressure during the polymerization.

4. The process according to claim 1 characterized in that the polymerization vessel is kept filled by the addition of water at a gradually increased pressure during the polymerization.

* * * * *